United States Patent
Zhou et al.

(10) Patent No.: US 10,931,755 B2
(45) Date of Patent: Feb. 23, 2021

(54) METHOD AND APPARATUS FOR MANAGING A SHARED STORAGE SYSTEM

(71) Applicant: BEIJING XIAOMI MOBILE SOFTWARE CO., LTD., Beijing (CN)

(72) Inventors: Yingchao Zhou, Beijing (CN); Zhen Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 75 days.

(21) Appl. No.: 15/935,543

(22) Filed: Mar. 26, 2018

(65) Prior Publication Data

US 2018/0288155 A1    Oct. 4, 2018

(30) Foreign Application Priority Data

Mar. 28, 2017   (CN) .......................... 201710194177.3

(51) Int. Cl.
| | | |
|---|---|---|
| *G06F 15/16* | (2006.01) | |
| *H04L 29/08* | (2006.01) | |
| *G06F 3/06* | (2006.01) | |
| *G06F 9/50* | (2006.01) | |

(52) U.S. Cl.
CPC .......... *H04L 67/1097* (2013.01); *G06F 3/067* (2013.01); *G06F 3/0611* (2013.01); *G06F 3/0659* (2013.01); *G06F 9/505* (2013.01)

(58) Field of Classification Search
CPC ............................ H04L 67/1097; G06F 9/505
USPC ....................................................... 709/217
See application file for complete search history.

(56) References Cited

U.S. PATENT DOCUMENTS

| | | | | |
|---|---|---|---|---|
| 8,914,497 | B1 * | 12/2014 | Xiao ....................... | H04L 47/78 709/224 |
| 2010/0274933 | A1 | 10/2010 | Wang | |
| 2012/0259944 | A1 | 10/2012 | Fukuguchi et al. | |
| 2013/0024634 | A1 | 1/2013 | Shitomi | |
| 2015/0178016 | A1 | 6/2015 | Lim | |

(Continued)

FOREIGN PATENT DOCUMENTS

| | | |
|---|---|---|
| CN | 102724301 A | 10/2012 |
| CN | 103797770 A | 5/2014 |
| CN | 104253870 A | 12/2014 |

(Continued)

OTHER PUBLICATIONS

European Extended Search Report issued in corresponding EP Patent Application No. 18164732.2, dated Jun. 27, 2018, 10 pages.

(Continued)

*Primary Examiner* — Hee Soo Kim
(74) *Attorney, Agent, or Firm* — Arch & Lake LLP

(57) ABSTRACT

A method and apparatus are provided for controlling a client device in the communication field. The method may include: receiving a read-write request message sent by a client device; acquiring a first load amount of a shared storage system currently after processing the read-write request messages; sending processing result information resulted from processing the read-write request message to the client device, where the processing result information includes the first load amount; and causing the client device to adjust frequency of sending the read-write request message to the shared storage system according to the first load amount.

15 Claims, 4 Drawing Sheets

(56) References Cited

U.S. PATENT DOCUMENTS

2015/0263978 A1* 9/2015 Olson .................... G06F 3/061
709/226
2017/0046072 A1 2/2017 Byrd

FOREIGN PATENT DOCUMENTS

| CN | 106453669 A | 2/2017 | | |
|---|---|---|---|---|
| WO | 2013101947 A1 | 4/2013 | | |
| WO | WO-2013101947 A1 * | 7/2013 | ............. | G06F 3/061 |

OTHER PUBLICATIONS

First Office Action corresponding to Chinese Application No. 201710194177.3, dated Apr. 24, 2019 and English translation, (13p).
Notification to Grant Patent Right for Invention corresponding to Chinese application No. 201710194177.3, dated May 7, 2020 and English translation, (7p).

* cited by examiner

METHOD AND APPARATUS FOR MANAGING A SHARED STORAGE SYSTEM

CROSS-REFERENCE TO RELATED APPLICATION

This application is based on and claims priority to Chinese Patent Application Serial No. 201710194177.3, filed with the State Intellectual Property Office of P. R. China on Mar. 28, 2017, the entire contents of which are incorporated herein by reference.

TECHNICAL FIELD

The present disclosure relates to the field of communication, and more particularly, to a method and apparatus for managing a shared storage system by controlling a client in the shared storage system.

DESCRIPTION

A shared storage system is commonly used for big data applications and may be accessed by multiple clients. The clients store data on the shared storage system, and subsequently read the data from the shared storage system as necessary. Since the shared storage system is commonly accessed by the multiple clients, it is necessary to control read requests and write requests from the multiple clients, to prevent a large number of read requests and write requests overloading the shared storage system.

In the related art, the shared storage system may preset a load threshold, and then the shared storage system may monitor the load generated by each client. When a client generates a load that is greater than the load threshold, the shared storage system rejects read requests and write requests initiated by the client, so that the shared storage system may avoid an excessive overall load.

SUMMARY

The present disclosure provides a method and apparatus for managing a shared storage system. The solutions are as follows.

According to a first aspect of the present disclosure, a method for managing a shared storage system is provided. This method includes: receiving a read-write request messages sent by a client device; processing the read-write request message; acquiring a current first load amount of the shared storage system after processing the read-write request message; sending processing result information resulted from processing the read-write request message to the client device, wherein the processing result information includes the first load amount, and the first load amount is used to make the client device adjust frequency of sending the read-write request message to the shared storage system.

According to a second aspect of the present disclosure, a method for managing a shared storage system is provided. This method includes: sending a read-write request message to the shared storage system; receiving processing result information sent by the shared storage system and resulted from processing the read-write request message, wherein the processing result information includes a current first load amount of the shared storage system; and adjusting frequency of sending the read-write request message to the shared storage system in accordance with the first load amount.

According to a third aspect of the present disclosure, an apparatus for managing a shared storage system is provided. This apparatus includes: a processor; and a memory configured to store executable instructions executed by the processor; wherein, the processor is configured to: receive a read-write request message sent by a client device; process the read-write request message; acquire a current first load amount of the shared storage system after processing the read-write request message; send processing result information resulted from processing the read-write request messages to the client device, the processing result information includes the first load amount, and the first load amount is used to make the client device adjust frequency of sending the read-write request message to the shared storage system.

According to a fourth aspect of the present disclosure, an apparatus for managing a shared storage system is provided. This apparatus includes: a processor, and a memory configured to store executable instructions executed by the processor. The processor is configured to: send a read-write request message to the shared storage system; receive processing result information sent by the shared storage system and resulted from processing the read-write request message, the processing result information includes a current first load amount of the shared storage system; and adjust frequency of sending the read-write request messages to the shared storage system in accordance with the first load amount.

According to a fifth aspect of the present disclosure, there is provided a non-transitory computer readable storage medium, storing instructions that, when executed by one or more processors, cause the one or more processors to perform the method for controlling a client device mentioned in the first aspect.

According to a sixth aspect of the present disclosure, there is provided a non-transitory computer readable storage medium, storing instructions that, when executed by one or more processors, cause the one or more processors to perform the method for controlling a client device mentioned in the second aspect.

Understandably, the foregoing general description and the following detailed description are only exemplary and explanatory, and do not limit the scope of the present disclosure.

BRIEF DESCRIPTION OF THE DRAWINGS

The drawings herein are incorporated in and constitute a part of this specification, show the embodiments consistent with the present disclosure, and together with the description, serve to explain the principles of the present disclosure.

The embodiments of the present disclosure are illustrated openly and clearly in the above figures, and are described in more detail subsequently. The figures and description are not intended to limit the scope of the present disclosure by any means, but rather to describe concept of the present disclosure for those skilled in the art by referring to the specific embodiments.

DETAILED DESCRIPTION

Hereinafter, exemplary embodiments may be described in detail, and examples thereof are shown in the figures. In the following description when referring to the figures, unless otherwise indicated, the same numerals in the different figures denote the same or similar elements. The embodiments described in the following exemplary embodiments do not represent all the embodiments consistent with the present disclosure. Rather, they are merely examples of the apparatus and method consistent with some aspects of the present disclosure in the appended claims.

The amount of load generated by a client device may be referred as the amount of data which is read by the client device from a shared storage system. The amount of the data to be read may be sent by the client device through a read request message to the shared storage system. Alternatively, the amount of load generated by the client device may be referred as the amount of data which is to be written by the client device into the shared storage system. The data to be written may be sent by the client device through a write request message to the shared storage system.

Currently, when the amount of load generated by a client device is greater than the load threshold, the shared storage system may reject the read-write request message initiated by the client device. However, when there are a large number of requests from the client devices, although the amount of load generated by each client is less than the load threshold, frequently sending by these client devices the read-write request messages to the shared storage system may overload the shared storage system.

Additionally, in some scenarios, abnormal actions from a few client devices may cause a large amount of load generated by each of the few client devices, and the large amount of load generated may exceed the load threshold. However, in these scenarios, the shared storage system may be idle and have sufficient resources to process the load generated by the client devices. Since the amount of load generated by the client devices exceeds the load threshold, a denial may be made by the shared storage system, resulting in the read-write requests from the client devices cannot be processed efficiently.

Figure 1:
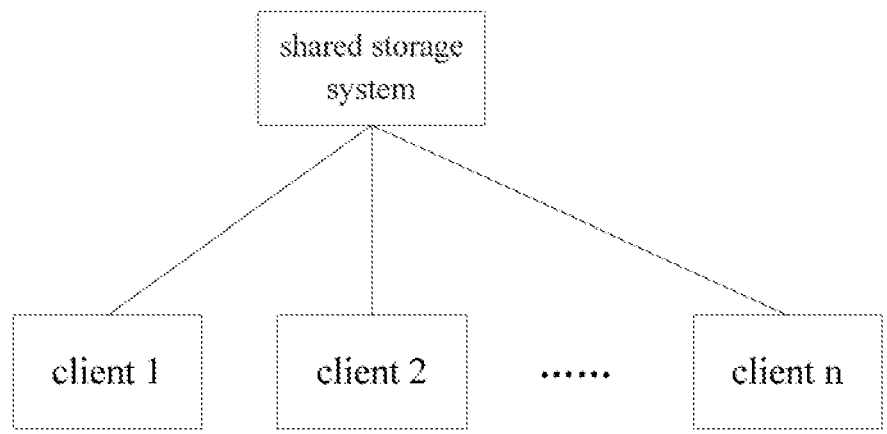
FIG. 1 is a diagram illustrating a network architecture in accordance with an aspect of the present disclosure.

Referring now to FIG. 1, which shows a diagram illustrating a network architecture in accordance with an aspect of the present disclosure. The network architecture comprises: a shared storage system and n clients, wherein n is an integer greater than or equal to 1, each of the n clients may establish a long connection with the shared storage system.

Each of the clients may send data to the shared storage system through the long connection therewith, such that the shared storage system may store the data. Alternatively, each of the clients may read the data from the shared storage system through the long connection therewith.

The shared storage system may be HDFS/HBASW clusters, NAS/SAN devices, any cloud storages, or etc. The client may be a client device or a client node connected to the HDFS/HBASW clusters. The client may also be any computing device connected to the NAS/SAN devices or other storage systems.

Figure 2A:
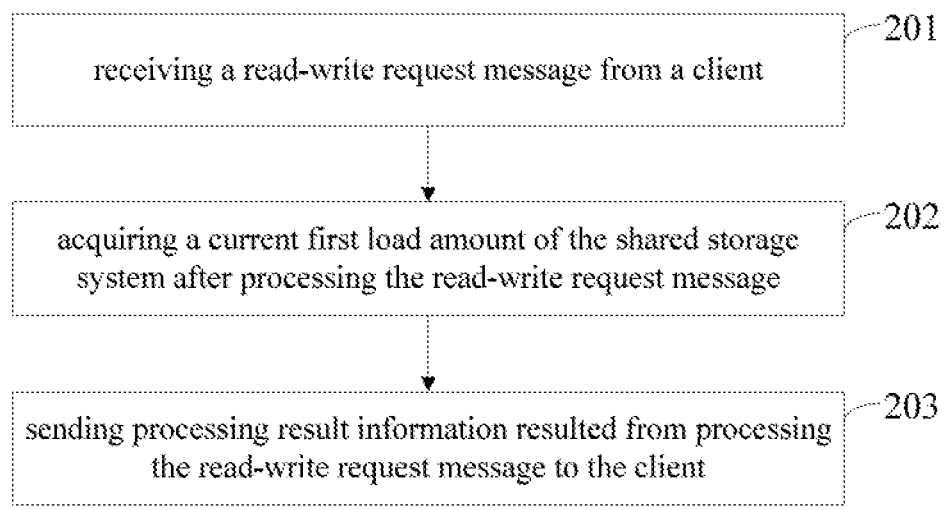
FIG. 2A is a flowchart illustrating a method for controlling a client device in accordance with an aspect of the present disclosure.

Referring now to FIG. 2A, which shows a flowchart illustrating a method for controlling a client in accordance with an aspect of the present disclosure. The method includes:

In step 201, receiving a read-write request messages from a client.

In step 202, acquiring a current first load amount of the shared storage system after processing the read-write request message.

In step 203, sending processing result information resulted from processing the read-write request message to the client, where the processing result information includes the first load amount. The processing result information may cause the client to adjust frequency of sending the read-write request message to the shared storage system according to the first load amount. For example, when the first load amount is above a preset threshold, the client may lower the frequency of sending the read-write request message to the shared storage system.

In one or more embodiments, the shared storage system may acquire the current first load amount after processing the read-write request message from the clients, and attach the first load amount to the processing result information sent to the clients. Thus, the client may adjust the frequency of sending the read-write request message to the shared storage system in accordance with the first load amount. Before the shared storage system is overloaded, the abnormal clients may adjust the frequency of sending the read-write request message to the shared storage system in accordance with the first load amount. That is, the abnormal clients may adjust the amount of load generated by the abnormal clients. In this manner, the load generated by the abnormal clients may be reduced, so that the clients may generate the load smoothly, thereby protecting the shared storage system from degraded availability due to abnormal load generated by the few clients.

Figure 2B:
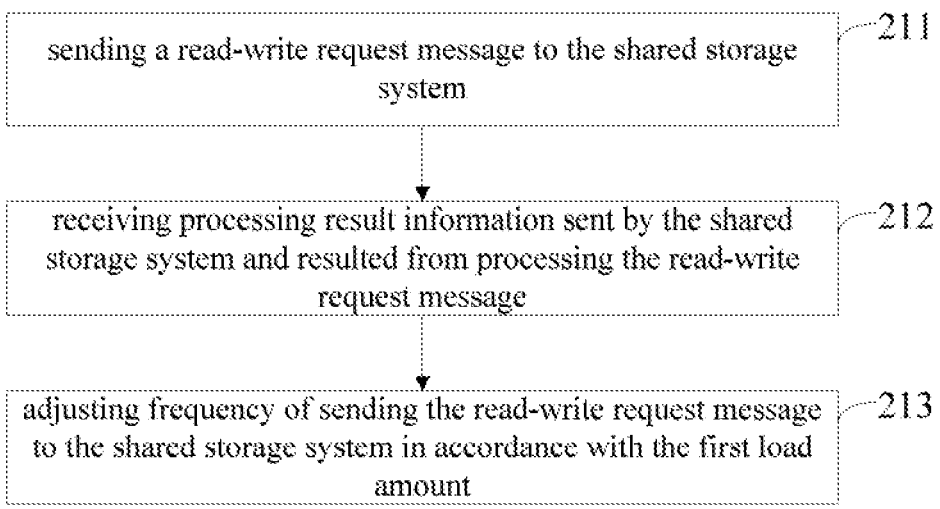
FIG. 2B is a flowchart illustrating a method for controlling a client device in accordance with an aspect of the present disclosure.

Referring now to FIG. 2B, which shows a flowchart illustrating a method for controlling a client in accordance with another aspect of the present disclosure. The method includes:

In step 211, sending a read-write request message to the shared storage system.

In step 212, receiving processing result information sent by the shared storage system and resulted from processing the read-write request message, where the processing result information includes a current first load amount of the shared storage system.

In step 213, adjusting frequency of sending the read-write request message to the shared storage system in accordance with the first load amount.

In one or more embodiments, the client may receive the processing result information which carries the current first load amount of the shared storage system and is sent by the shared storage system, and adjust the frequency of sending the read-write request message to the shared storage system in accordance with the first load amount. Before the shared storage system is overloaded, the abnormal clients are caused to adjust the frequency of sending the read-write request message to the shared storage system in accordance with the first load amount, so as to adjust the amount of load generated by the abnormal clients. In this manner, the load generated by the abnormal clients may be reduced during a fixed time period, so that each of the clients may generate the load smoothly, thereby protecting the shared storage system from degraded availability due to the abnormal load generated by the few clients.

Figure 3:
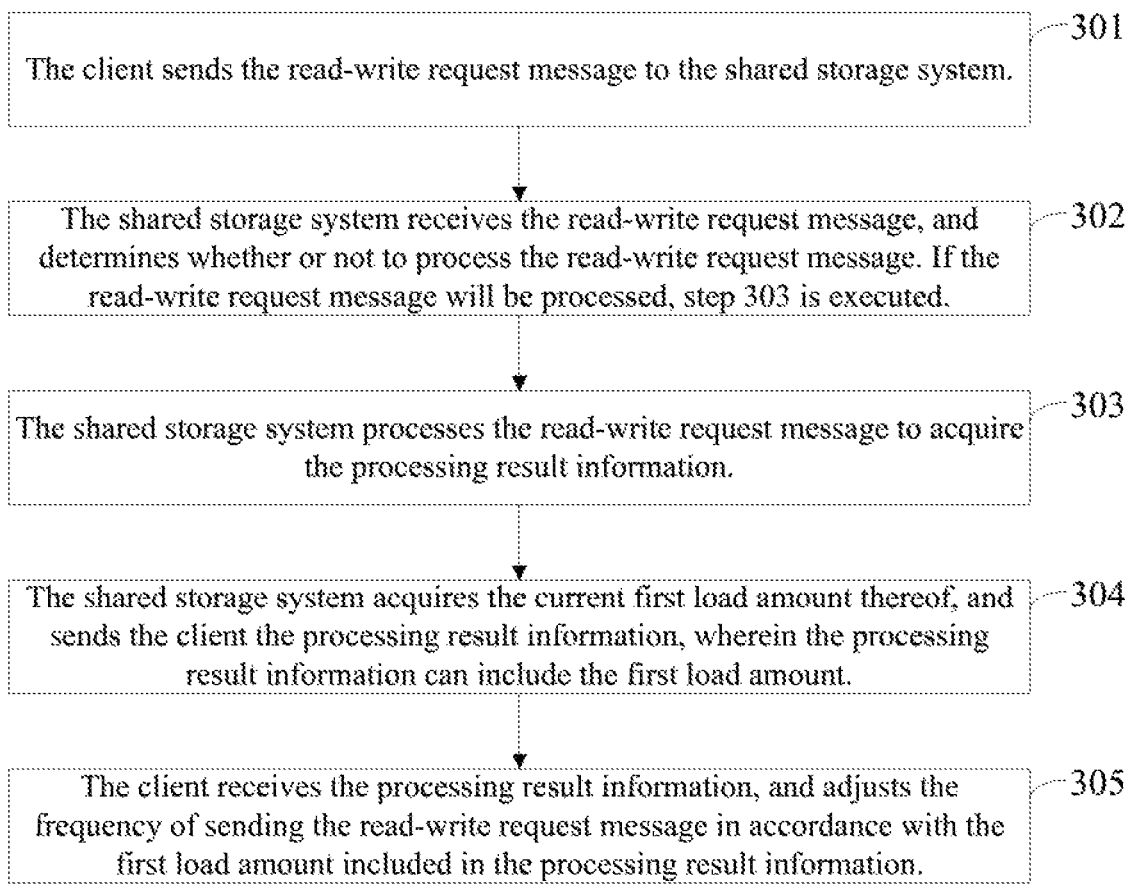
FIG. 3 is a flowchart illustrating a method for controlling a client device in accordance with an aspect of the present disclosure.

FIG. 3 shows a flowchart illustrating a method for controlling a client in accordance with another aspect of the present disclosure. The method may include at least following steps:

In step 301: the client sends the read-write request message to the shared storage system.

The read-write request message includes a read request message or a write request message.

When the client needs to read data from the shared storage system, the client may send a read request message to the shared storage system, wherein the read request message carries information, such as, a file identifier and a beginning location of the stored file, and an amount of data to be read by the client. Here, the stored file corresponding to the file identifier thereof may be stored in the shared storage system, the data which is to be read by the client may be stored in the stored file, and the beginning location of the data to be read by the client and stored in the stored file may be the beginning location carried in the read request message.

When the client needs to store data in the shared storage system, the client may send a write request message to the shared storage system, wherein the write request message carries information, such as, a file identifier and a beginning location of the stored file, and the data to be written by the client. Here, the stored file corresponding to the file identifier thereof may be stored in the shared storage system, and the client may need to store the data to be written by the client in the stored file from the beginning location carried in the write request message.

In step 302, the shared storage system receives the read-write request message, and determines whether or not to process the read-write request message. If the read-write request will be processed, step 303 is executed.

When the read-write request message includes a read request, in the current step, the shared storage system extracts the amount of data to be read from the read request message. When the amount of the data to be read exceeds a preset first load threshold, a current second load amount of the shared storage system may be acquired. When the second load amount is less than a preset second load threshold, it is determined that the read request may be processed. When the amount of the data to be read does not exceed the preset first load threshold, it is determined that the read request may be processed. In addition, when the amount of the data to be read exceeds the preset first load threshold and the second load amount is larger than or equal to a preset second load threshold, it is determined that the read request will not be processed.

When the read-write request message includes a write request, in the current step, the shared storage system extracts the data to be written from the write request message, and calculates the amount of the data to be written. When the amount of the data to be written exceeds the preset first load threshold, the current second load amount of the shared storage system may be acquired. When the second load amount is less than the preset second load threshold, it is determined that the write request may be processed. When the amount of the data to be written does not exceed the preset first load threshold, it is determined that the write request may be processed. In addition, when the amount of the data to be write exceeds the preset first load threshold and the second load amount is larger than or equal to a preset second load threshold, it is determined that the write request will not be processed.

When the amount of the data to be written or the amount of the data to be read exceeds the preset first load threshold, it indicates that the clients may generate a large amount of load. In order to process the read-write request message from the client, the shared storage system may also acquire the current second load amount. When the second load amount is less than the preset second load threshold, it indicates that the current load amount of the shared storage system is low, and sufficient resources may be utilized to process the load generated by the clients. Thus, when the few abnormal clients generate a large amount of load, the shared storage system may not refuse the read-write request messages from the clients, and the read or write request from the clients may still be processed.

In some embodiments, the operation of acquiring the current second load amount of the shared storage system may include:

the shared storage system may acquire each of the read request messages received currently, acquire a first accumulated amount by accumulating the amount of the data to be read carried in each of the read request messages; acquire each of the write request messages received currently, calculate the amount of the data to be written carried in each of the write request messages, acquire a second accumulated amount by accumulating the amount of the data to be written carried in each of the write request messages; and acquire the current second load amount of the shared storage system by summing the first accumulated amount and the second accumulated amount.

In some embodiments, when it is determined that the write request is not processed, the shared storage system may send a notification message to the client, to notify the client.

The client upon receiving the notification message, may stop sending the read-write request message to the shared storage system. Alternatively, the client may send the read-write request message to the shared storage system again.

In step 303, the shared storage system processes the read-write request message to acquire the processing result information.

When the read-write request message is the read request message, in the current step, the shared storage system may extract information, such as, the file identifier and the beginning location of the stored file, and the amount of data to be read, from the read request message, and acquire the stored file corresponding to the file identifier thereof. In accordance with the amount of the data to be read, the data to be read may be read from the beginning location of the stored file, such that, the processing result information resulted from processing the read request message may be the data to be read.

When the read-write request message is the write request message, in the current step, the shared storage system may extract information, such as, the file identifier and the beginning location of the stored file, and the amount of data to be written, from the write request message, acquire the stored file corresponding to the file identifier thereof, and store the data to be written into the stored file from beginning location. When the data to be written is stored successfully, the processing result information acquired by processing the write request may be write success information. When the data to be written is not stored successfully, the processing result information acquired by processing the write request may be write failure information.

In step 304, the shared storage system acquires the current first load amount thereof, and sends the client the processing result information, wherein the processing result information may include the first load amount.

The shared storage system may attach the first load amount into the processing result information. In practical implementation, the first load amount may be inserted into the processing result information.

The operation of acquiring the current first load amount of the shared storage system may include:

The shared storage system may use the second load amount acquired in step 302 as the current first load amount. As the time interval between a time point of performing step 304 and a time point of performing step 302 is small, the second load amount acquired in step 302 may be used as the current first load amount.

Alternatively or additionally, to make the current first load amount to be accurate and timely, the current first load amount may be calculated again in step 304, which includes:

the shared storage system may acquire each of unprocessed read request messages received currently after processing at least one read-write request message, acquire a third accumulated amount by accumulating the amount of the data to be read carried by each of the read request messages; acquire each of unprocessed write request messages received currently after processing at least one read-write request message, calculate the amount of the data to be written carried by each of write request messages, acquire a fourth accumulated amount by accumulating the amount of the data to be written carried by each of the write request messages; acquire the current first load amount of the shared storage system by summing the third accumulated amount and the fourth accumulated amount. Thus, the current first load amount may be updated by summing the third accumulated amount and the fourth accumulated amount.

When the read-write request message is the read request message, the shared storage system may send the data to be read to the client, and the data to be read may include the first load amount. In some embodiments, in a specific implementation, the first load amount may be inserted in a location which is prior to the beginning location or behind the end location of the data to be read. Alternatively, the first load amount may be inserted into a preset location of the data to be read. For example, the first load amount may be inserted into a location between the $n^{th}$ byte and the $(n+1)^{th}$ byte calculated from the beginning location of the data to be read.

Here, the first load amount may occupy m byte(s). A preset number of bits may be added for the first load amount when a data length of the first load amount is less that m byte(s). n may be an integer larger than or equal to 1, such as 1, 2, 3, 4 or 5 and so forth; m may be an integer larger than or equal to 1, such as 1, 2, 3, 4 or 5 and so forth.

Here, the inserted location into which the first load amount is inserted, of the data to be read may be scheduled between the shared storage system and the client, or the inserted location may be a default location agreed by both sides.

When the read-write request message is the write request message, the shared storage system may send the write success information to the client. The write success information may include the first load amount. Alternatively, the shared storage system may send the write failure information to the client. The write failure information may include the first load amount.

The write success information may carry the first load amount. In a specific implementation, when the write success information includes a reserved field, the first load amount may be carried in the reserved field of the write success information. Alternatively, a new filed may be added into the write success information, and the first load amount may be carried in the new field of the write success information.

Similarly, the write failure information may carry the first load amount. In a specific implementation, when the write failure information includes a reserved field, the first load amount may be carried in the reserved field of the write failure information. Alternatively, a new filed may be added into the write failure information, and the first load amount may be carried in the new field of the write failure information.

In some embodiments, in step 304, the first load amount may not be included into the processing result information. The shared storage system may send the processing result information and the first load amount simultaneously to the client. Alternatively, the shared storage system may send the processing result information and the first load amount separately to the client.

In step 305, the client receives the processing result information, and adjusts the frequency of sending the read-write request message in accordance with the first load amount included in the processing result information. Alternatively or additionally, the client device may adjust the time period for sending the read-write request message or skip sending one or more read-write request messages to the shared storage system.

In the current step, the client may receive the processing result information, and extract the current first load amount of the shared storage system from the processing result information. Alternatively, the client may receive the processing result information and the first load amount. When the first load amount exceeds the preset second load threshold, the frequency of sending the read-write request message to the shared storage system may be reduced. When the first load amount does not exceed the preset second load threshold, the frequency of sending the read-write request message to the shared storage system may be increased or unchanged.

In some embodiments, extracting the first load amount may include:

When the processing result information indicates the data to be read by the client, the inserted location scheduled between the shared storage system and the client or the default inserted location may be acquired, and the first load amount may be extracted in accordance with the acquired inserted location.

For example, when the first load amount is inserted into the beginning location or the end location of the date to be read by schedule between the shared storage system and the client or by default, m bytes of data may be read as the first load amount from the beginning location or the end location of the data to be read.

For another example, when the first load amount is inserted into a location behind the $n^{th}$ byte calculated from the beginning location of the data to be read by schedule between the shared storage system and the client or by default, m bytes of data between the $n^{th}$ byte and the $(n+m)^{th}$ byte calculated from the beginning location of the data to be read and may be extracted as the first load amount.

When the processing result information indicates the write success information or the write failure information, the first load amount may be extracted from the reserved field of the write success information or the write failure information; alternatively, the first load amount may be extracted from the new field of the write success information or the write failure information.

Here, for abnormal clients, the abnormal clients generate a large amount of load in a period of time. The abnormal clients continue to send read-write request message to the shared storage system when the abnormal clients determine that the first load amount does not exceed the preset second load threshold, which indicates an idle shared storage system, such that the shared storage system may process the generated load timely. The abnormal clients may reduce the frequency of sending read-write request message to the shared storage system when the abnormal clients determine that the first load amount exceeds the preset second load threshold, which indicates an overloaded shared storage system. In this manner, before the shared storage system is overloaded, the load generated by the abnormal clients may be reduced, and the load pressure of the shared storage system may be lowered.

In one or more embodiments, when the shared storage system receives the read-write request message from the client, and the amount of the data to be read by the client or the amount of the data to be written by the client exceeds the preset first load threshold, the current second load amount may be acquired. When the second load amount is less than the preset second load threshold, it indicates that the shared storage system is idle, and the read-write request of the client may be processed. Thus, the read-write request from the few abnormal clients may be processed effectively. The shared storage system may also acquire the current first load amount after processing the read-write request message from the client, and attach the first load amount into the processing result information sent to the client. Thus, the client may adjust the frequency of sending the read-write request message to the shared storage system in accordance with the first load amount. Before the shared storage system is overloaded, the load generated by the abnormal clients may be reduced, such that the clients may generate the load smoothly, thereby preventing the shared storage system from availability reduction due to the abnormal load caused by the few clients.

The following is an apparatus in the embodiments of the present disclosure, which may be used to carry out the method in the embodiments of the present disclosure. The details not disclosed in the apparatus in the embodiments of the present disclosure, may be referenced to the method in the embodiments of the present disclosure.

An apparatus for controlling a client is provided in an aspect of the present disclosure. The apparatus may include: a processor, and a memory configured to store executable instructions executed by the processor; wherein, the processor is configured to: receive a read-write request message sent by the client; process the read-write request message; acquire a current first load amount of the shared storage system after processing the read-write request message; and send processing result information resulted from processing the read-write request message to the client, wherein the processing result information includes the first load amount, and the first load amount is used to enable the client to adjust frequency of sending the read-write request message to the shared storage system.

In some embodiments, the read-write request message includes a read request message, wherein the read request message carries an amount of data to be read by the client;

In some embodiments, the processor is further configured to, acquire a current second load amount of the shared storage system when the data amount of the data to be read exceeds a preset first load threshold, and process the read request message when the second load amount is less than a preset second load threshold.

In some embodiments, the read-write request message includes a write request message, and the write request message carries data to be written by the client.

In some embodiments, the processor is further configured to, acquire the current second load amount of the shared storage system when the amount of the data to be written exceeds the preset first load threshold, and process the write request message when the second load amount is less than a second load threshold.

In the embodiment of the present disclosure, the shared storage system may also acquire the current first load amount after processing the read-write request message from the client, and may attach the first load amount into the processing result information sent to the client. Thus, the client may adjust the frequency of sending the read-write request message to the shared storage system in accordance with the first load amount. Before the shared storage system is overloaded, the abnormal clients may adjust the frequency of sending the read-write request message to the shared storage system in accordance with the first load amount, so as to adjust the amount of load generated by the abnormal clients. In this manner, the load generated by the abnormal clients may be reduced, such that the clients may generate the load smoothly, thereby preventing the shared storage system from availability reduction due to the abnormal load caused by the few clients.

An apparatus for controlling a client is provided in an aspect of the present disclosure. The apparatus may include: a processor; and a memory configured to store executable instructions executed by the processor; wherein, the processor is configured to: send a read-write request message to a shared storage system; receive processing result information sent by the shared storage system and resulted from processing the read-write request message, wherein the processing result information includes a current first load amount of the shared storage system; and adjust frequency of sending the read-write request message to the shared storage system in accordance with the first load amount.

In some embodiments, the processor is further configured to reduce the frequency of sending the read-write request message to the shared storage system, when the first load amount exceeds a preset second load threshold.

In the embodiment of the present disclosure, by receiving the processing result information which carries the first load amount of the shared storage system, the client may adjust the frequency of sending the read-write request message to the shared storage system in accordance with the first load amount. Before the shared storage system is overloaded, the load generated by the abnormal clients may be reduced, thereby preventing the shared storage system from availability reduction due to the abnormal load caused by the few clients.

With respect to the apparatus of the above embodiment, the specific manner of operation performed by each module has been described in detail in the embodiment of the method, and the description thereof may not be described in detail herein.

Figure 4:
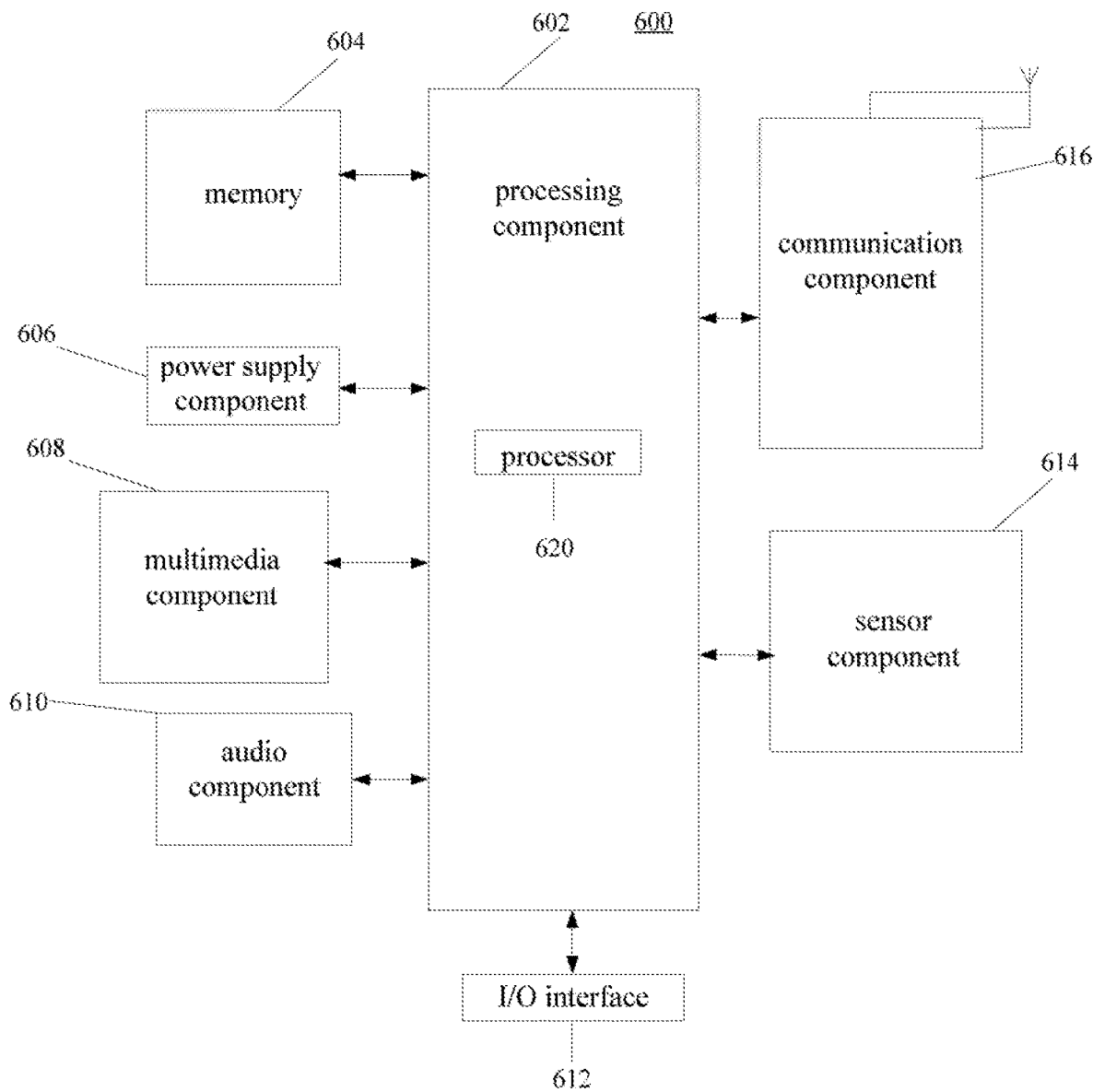
FIG. 4 is a block diagram illustrating an apparatus for controlling a client device in accordance with an aspect of the present disclosure.

FIG. 4 is a block diagram of an apparatus 600 in accordance with an exemplary embodiment. The apparatus 600 may be the clients in FIG. 1 and FIG. 3. For example, the apparatus 600 may be a mobile phone, a computer, a digital broadcast terminal, a messaging device, a game console, a tablet device, a medical device, a fitness device, a personal digital assistant, and the like.

As shown in FIG. 4, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally may control the overall operation of the apparatus 600, such as operations associated with display, phone call, data communication, camera operation, and recording operations. The processing component 602 may include one or more processors 620 to execute instructions, to complete all or part of the steps described above. In addition, the processing component 602 may include one or more modules to facilitate the interactions between the processing component 602 and other components. For example, the processing component 602 may include a multimedia module to facilitate interaction between the multimedia component 608 and the processing component 602.

The memory 604 may be configured to store various types of data to support the operation of the apparatus 600. Examples of such data may include instructions of any application or method, contact data, phonebook data, messages, pictures, videos, and the like, that operates on the apparatus 600. The memory 604 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 606 may provide power to the various components of the apparatus 600. The power supply component 806 may include a power management system, one or more power supplies, and other components associated with generating, managing, and distributing power for the apparatus 600.

The multimedia component 608 may include a screen providing an output interface between the apparatus 600 and the user. In some embodiments, the screen may include a liquid crystal display (LCD) and a touch panel (TP). If the screen includes a touch panel, the screen may be implemented as a touch screen to receive input signals from the user. The touch panel may include one or more touch sensors to sense touches, slide, and gestures on touch panels. The touch sensors may sense not only the boundary of the touch or slide actions, but also the duration and pressure associated with the touch or slide operation. In some embodiments, the multimedia component 808 may include a front camera and/or a rear camera. When the apparatus 600 is at an operating mode, such as a shooting mode or a video mode, the front camera and/or the rear camera may receive external multimedia data. Each front camera and rear camera may be a fixed optical lens system or have focal length and optical zoom capability.

The audio component 610 may be configured to output and/or input an audio signal. For example, the audio component 610 may include a microphone (MIC) that is configured to receive external audio signals when the apparatus 600 is in the operating mode, such as a call mode, a recording mode, and a voice recognition mode. The received audio signals may be further stored in the memory 604 or transmitted via the communication component 616. In some embodiments, the audio component 610 may also include a speaker for outputting the audio signals.

The I/O interface 612 may provide the interface between the processing component 602 and a peripheral interface module, the peripheral interface module may be a keyboard, a mouse, buttons, or the like. The buttons may include, but are not limited to, a home button, a volume button, a start button, and a lock button.

The sensor component 614 may include one or more sensors for providing condition assessments of the various aspects of the apparatus 600. For example, the sensor component 614 may detect the on/off state of the apparatus 600, the relative positioning of the components, such as the components may be the display and keypad of the apparatus 600, and the sensor component 614 may also detect position changes of the apparatus 600 or any component thereof, presence or absence of the user contact with the apparatus 600, orientation, acceleration/deceleration, or the temperature changes of the apparatus 600. The sensor component 614 may include an approaching sensor configured to detect the presence of a nearby object without any physical contact. The sensor component 614 may also include a light sensor, such as a CMOS or CCD image sensor, for imaging applications. In some embodiments, the sensor component 614 may also include acceleration sensors, gyro sensors, magnetic sensors, pressure sensors, or temperature sensors.

The communication component 616 may be configured to facilitate wired or wireless communication between the apparatus 600 and other apparatuses. The apparatus 600 may access a wireless network based on a communication standard, such as WIFI, 2G or 3G, or a combination thereof. In an exemplary embodiment, the communication component 616 may receive broadcast signals or broadcast-related information from an external broadcast management system via broadcast channels. In an exemplary embodiment, the communication component 616 may also include a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other techniques.

In an exemplary embodiment, the apparatus 600 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method described above.

In an exemplary embodiment, there is also provided a non-transitory computer readable storage medium including instructions, such as the memory 604 including the instructions. The instructions may be executed by the processor 620 of the apparatus 600 to complete the method described above. For example, the non-transitory computer readable storage medium may be a ROM, a random access memory (RAM), a CD-ROM, a magnetic tape, a floppy disk, an optical data storage device, etc.

A non-transitory computer readable storage medium may include instructions that, when executed by the processor of the apparatus 600, cause the apparatus 600 to perform the method for controlling a client. The method includes:

sending a read-write request message to a shared storage system;

receiving processing result information sent by the shared storage system and resulted from processing the read-write request message, wherein the processing result information includes a current first load amount of the shared storage system; and adjusting frequency of sending the read-write request message to the shared storage system in accordance with the first load amount.

In some embodiments, adjusting the frequency of sending the read-write request message to the shared storage system in accordance with the first load amount includes:

when the first load amount exceeds a preset second load threshold, reducing the frequency of sending the read-write request message to the shared storage system.

Figure 5:
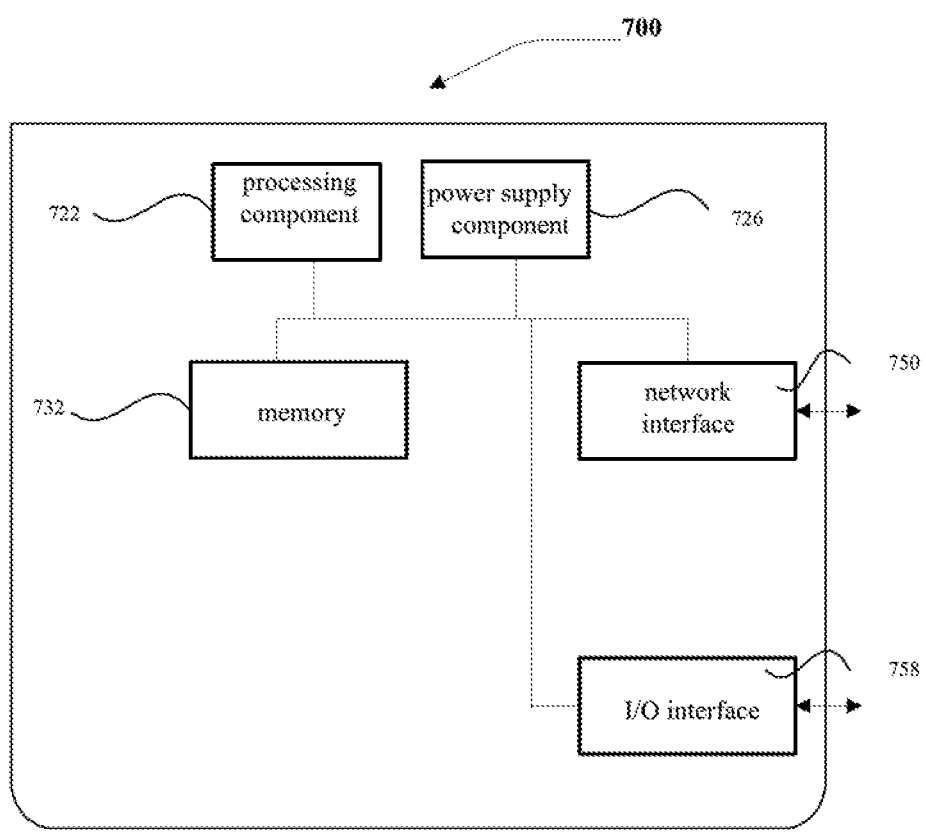
FIG. 5 is a block diagram illustrating an apparatus for controlling a client device in accordance with an aspect of the present disclosure.

FIG. 5 is a structural schematic diagram of an apparatus 700 for controlling a client shown in accordance with an exemplary embodiment. The apparatus 700 may be the shared storage system in the embodiments shown in FIG. 1 and FIG. 3. For example, the apparatus 700 may be provided as a server. Referring to FIG. 7, the apparatus 700 includes a processing component 722 which further includes one or more processors and a memory resource which is represented by a memory 732. The memory resource is used to save the instructions, such as applications, executed by the processing component 722. The applications saved in the memory 732 could include one or more than one modules, each of which corresponds to a set of instructions. Moreover, the processing component 722 is configured to execute instructions, so as to perform the method for controlling clients above.

The apparatus 700 could also include a power supply component 726, which is configured to manage the power supply of apparatus 700, a wired or wireless network interface 750, which is configured to connect the apparatus 700 to network, and an input and output (I/O) interface 758. The apparatus 700 is capable of running operating systems saved in the memory 732 such as Windows Server™, Mac OS X™, Unix™, Linux™ and FreeBSD™, or the like.

Other embodiments of the present disclosure may be available to those skilled in the art upon consideration of the specification and practice of the invention disclosed herein. The present application is intended to cover any variations, uses, or adaptations of the present disclosure following general principles of the present disclosure and include the common general knowledge or conventional technical means in the art without departing from the present disclosure. The specification and examples may be shown as illustrative only, and the true scope and spirit of the disclosure are indicated by the following claims.

Understandably, this disclosure is not limited to the precise constructions described above and shown in the enclosed drawings, and various modifications and changes may be made without departing from the scope thereof. The scope of the present disclosure may be limited only by the appended claims.

What is claimed is:

1. A method for managing a shared storage system, comprising:
    receiving a read-write request message sent by a client device;
    acquiring a current second load amount of the shared storage system when an abnormal client generates an amount of data to be read or written by the client device carried by the read-write request message that exceeds a preset first load threshold, and refusing the read-write request message when the second load amount is more than a preset second load threshold, wherein the preset first load threshold is to compare with the amount of data carried by each read-write request message and the preset second load threshold is to compare with the current second load amount of the shared storage system, and the read-write request message is refused in the event that the amount of data carried by each read-write request message exceeds the preset first load threshold and the current second load amount of the shared storage system exceeds the preset second load threshold;
    processing the read-write request message when the second load amount is less than the preset second load threshold;
    acquiring a current first load amount of the shared storage system after processing the read-write request message;
    sending processing result information resulted from processing the read-write request message to the client device, wherein the processing result information comprises the first load amount; and
    requesting the client device to adjust frequency of sending the read-write request message to the shared storage system according to the first load amount, wherein the client device adjusts the frequency of sending the read-write request message by performing one of the following: adjusting a time period for sending the read-write request message, or skipping sending one or more read-write request messages to the shared storage system.

2. The method of claim 1, wherein the read-write request message comprises a read request message, the read request message carries an amount of data to be read by the client device, acquiring the current second load amount of the shared storage system when the amount of the data to be read or written by the client device carried by the read-write request message that exceeds the preset first load threshold, and processing the read-write request message when the second load amount is less than the preset second load threshold, comprises:
    acquiring the current second load amount of the shared storage system when the amount of the data to be read exceeds the preset first load threshold, and processing the read request message when the second load amount is less than the preset second load threshold.

3. The method of claim 1, wherein the read-write request message comprises a write request message, the write request message carries data to be written by the client device, acquiring the current second load amount of the shared storage system when the amount of the data to be read or written by the client device carried by the read-write request message that exceeds the preset first load threshold, and processing the read-write request message when the second load amount is less than the preset second load threshold, comprises:
    acquiring the current second load amount of the shared storage system when the amount of the data to be written exceeds the preset first load threshold, and processing the write request message when the second load amount is less than the preset second load threshold.

4. The method of claim 1, further comprising:
    acquiring each read request message received currently, acquiring a first accumulated amount by accumulating a first amount of data to be read in each read request message;
    acquiring each write request message received currently, calculating a second amount of data to be written in each write request message, acquiring a second accumulated amount by accumulating the second amount of data to be written in each write request message; and
    acquiring a current second load amount of the shared storage system by summing the first accumulated amount and the second accumulated amount.

5. The method of claim 4, further comprising:
    acquiring each unprocessed read request message after processing at least one read-write request message, acquiring a third accumulated amount by accumulating a third amount of data to be read carried by each unprocessed read request message;

acquiring each unprocessed write request message after processing at least one read-write request message, calculating a fourth amount of data to be written in each unprocessed write request message, acquiring a fourth accumulated amount by accumulating the fourth amount of data to be written carried by each unprocessed write request message; and acquiring the current first load amount of the shared storage system by summing the third accumulated amount and the fourth accumulated amount.

6. An apparatus for managing a shared storage system, comprising:

a processor; and a memory configured to store executable instructions executed by the processor;

wherein, the processor is configured to:

receive a read-write request message sent by a client device;

acquire a current second load amount of the shared storage system when an abnormal client generates an amount of data to be read or written by the client device carried by the read-write request message that exceeds a preset first load threshold, and refuse the read-write request message when the second load amount is more than a preset second load threshold, wherein the preset first load threshold is to compare with the amount of data carried by each read-write request message and the preset second load threshold is to compare with the current second load amount of the shared storage system, and the read-write request message is refused in the event that the amount of data carried by each read-write request message exceeds the preset first load threshold and the current second load amount of the shared storage system exceeds the preset second load threshold;

process the read-write request message when the second load amount is less than the preset second load threshold;

acquire a current first load amount of a shared storage system after processing the read-write request message;

send processing result information resulted from processing the read-write request message to the client device, wherein the processing result information comprises the first load amount; and request the client device to adjust frequency of sending the read-write request message to the shared storage system according to the first load amount, wherein the client device adjusts the frequency of sending the read-write request message by performing one of the following: adjusting a time period for sending the read-write request message, or skipping sending one or more read-write request messages to the shared storage system.

7. The apparatus of claim 6, wherein the read-write request message comprises a read request message, and the read request message carries an amount of data to be read by the client device; and the processor is further configured to:

acquire the current second load amount of the shared storage system when the amount of the data to be read exceeds the preset first load threshold, and process the read request message when the second load amount is less than the preset second load threshold.

8. The apparatus of claim 6, wherein the read-write request message comprises a write request message, and the write request message carries data to be written by the client device; and the processor is further configured to:

acquire the current second load amount of the shared storage system when the amount of the data to be written exceeds the preset first load threshold, and process the write request message when the second load amount is less than the second load threshold.

9. The apparatus of claim 6, wherein the processor is further configured to:

acquire each read request message received currently, acquire a first accumulated amount by accumulating a first amount of data to be read in each read request message;

acquire each write request message received currently, calculate a second amount of data to be written in each write request message, acquire a second accumulated amount by accumulating the second amount of data to be written in each write request message; and acquire a current second load amount of the shared storage system by summing the first accumulated amount and the second accumulated amount.

10. The apparatus of claim 9, wherein the processor is further configured to:

acquire each unprocessed read request message after processing at least one read-write request message, acquire a third accumulated amount by accumulating a third amount of data to be read carried by each unprocessed read request message;

acquire each unprocessed write request message after processing at least one read-write request message, calculate a fourth amount of data to be written in each unprocessed write request message, acquire a fourth accumulated amount by accumulating the fourth amount of data to be written carried by each unprocessed write request message; and acquire the current first load amount of the shared storage system by summing the third accumulated amount and the fourth accumulated amount.

11. A non-transitory computer readable storage medium for managing a shared storage system having stored therein instructions that, when executed by one or more processors, cause one or more processors to perform operations comprising:

receiving a read-write request message sent by a client device;

acquiring a current second load amount of the shared storage system when an abnormal client generates an amount of data to be read or written by the client device carried by the read-write request message that exceeds a preset first load threshold, and refusing the read-write request message when the second load amount is more than a preset second load threshold, wherein the preset first load threshold is to compare with the amount of data carried by each read-write request message and the preset second load threshold is to compare with the current second load amount of the shared storage system, and the read-write request message is refused in the event that the amount of data carried by each read-write request message exceeds the preset first load threshold and the current second load amount of the shared storage system exceeds the preset second load threshold;

processing the read-write request message when the second load amount is less than the preset second load threshold;

acquiring a current first load amount of a shared storage system after processing the read-write request message; and sending processing result information resulted from processing the read-write request message to the client device, wherein the processing result information comprises the first load amount; and requesting the client device to adjust frequency of sending the read-write request message to the shared storage system according to the first load amount, wherein the client device adjusts the frequency of sending the read-write request message by performing one of the following: adjusting a time period for sending the read-write request message, or skipping sending one or more read-write request messages to the shared storage system.

12. The non-transitory computer readable storage medium of claim 11, wherein the read-write request message comprises a read request message, and the read request message carries an amount of data to be read by the client device; the operations further comprise:

acquiring the current second load amount of the shared storage system when the amount of the data to be read exceeds the preset first load threshold, and processing the read request message when the second load amount is less than the preset second load threshold.

13. The non-transitory computer readable storage medium of claim 11, wherein the read-write request message comprises a write request message, and the write request message carries data to be written by the client device; the operations further comprise:

acquiring the current second load amount of the shared storage system when the amount of the data to be written exceeds the preset first load threshold, and processing the write request message when the second load amount is less than the preset second load threshold.

14. The non-transitory computer readable storage medium of claim 11, wherein the operations further comprise:

acquiring each read request message received currently, acquiring a first accumulated amount by accumulating a first amount of data to be read in each read request message;

acquiring each write request message received currently, calculating a second amount of data to be written in each write request message, acquiring a second accumulated amount by accumulating the second amount of data to be written in each write request message; and acquiring a current second load amount of the shared storage system by summing the first accumulated amount and the second accumulated amount.

15. The non-transitory computer readable storage medium of claim 14, wherein the operations further comprise:

acquiring each unprocessed read request message after processing at least one read-write request message, acquiring a third accumulated amount by accumulating a third amount of data to be read carried by each unprocessed read request message;

acquiring each unprocessed write request message after processing at least one read-write request message, calculating a fourth amount of data to be written in each unprocessed write request message, acquiring a fourth accumulated amount by accumulating the fourth amount of data to be written carried by each unprocessed write request message; and acquiring the current first load amount of the shared storage system by summing the third accumulated amount and the fourth accumulated amount.

* * * * *